United States Patent [19]

Youcef-Toumi

[11] Patent Number: 5,144,549
[45] Date of Patent: Sep. 1, 1992

[54] TIME DELAY CONTROLLED PROCESSES

[75] Inventor: Kamal Youcef-Toumi, Newbury, Mass.

[73] Assignee: Massachusetts Institute of Technology, Cambridge, Mass.

[21] Appl. No.: 546,024

[22] Filed: Jun. 29, 1990

[51] Int. Cl.⁵ .................... G05B 13/02; G06F 15/46
[52] U.S. Cl. .................... 364/148; 364/150; 395/97
[58] Field of Search ............... 364/148, 149, 150, 152, 364/164, 165; 395/82, 97

[56] References Cited

U.S. PATENT DOCUMENTS

| 3,378,724 | 4/1975 | Allen | 73/362 AR |
|---|---|---|---|
| 4,458,321 | 7/1984 | Whitney et al. | 364/513 |
| 4,577,270 | 3/1986 | Sugano et al. | 364/151 |
| 4,621,332 | 11/1986 | Sugimoto et al. | 364/513 |
| 4,634,946 | 1/1987 | Moulds, III et al. | 318/561 |
| 4,663,703 | 5/1987 | Axelby et al. | 364/149 |
| 4,683,590 | 7/1987 | Miyoshi et al. | 381/71 |
| 4,742,444 | 5/1988 | Gose et al. | 364/157 |
| 4,742,778 | 5/1988 | Morishita et al. | 104/284 |
| 4,763,276 | 8/1988 | Perreirra et al. | 364/513 |
| 4,770,841 | 9/1988 | Haley et al. | 376/216 |
| 4,834,205 | 5/1989 | Mizuno et al. | 364/513 |
| 4,882,526 | 11/1989 | Iino et al. | 318/561 |
| 4,916,635 | 4/1990 | Singer et al. | 364/513 |
| 4,992,412 | 5/1990 | Lane et al. | 364/157 |

FOREIGN PATENT DOCUMENTS 0193609 9/1986 European Pat. Off. .
0383287 9/1988 European Pat. Off. .

OTHER PUBLICATIONS

Youcef-Toumi, Kamal et al. "A Time Delay Controller for Systems with Unknown Dynamics", Journal of Dynamic Systems, Measurement, and Control, Mar. 1990 vol. 112, pp. 133-142; presented at the American Control Conference, 1987, Minneapolis, Minn.

Primary Examiner—Jerry Smith
Assistant Examiner—Paul Gordon
Attorney, Agent, or Firm—Robert M. Asher

[57] ABSTRACT

A time delay control system in which estimated unknown dynamics of a controlled process are caluclated using calculations representative of convolutions of a state transition matrix with past data. A user or high level controller provides desired dynamics for a process. Periodic measurements of the processor taken to determine an error vector between the desired dynamics and the actual state of the process. The desired dynamics are used to determine the desired effects based on the present measured value of the state variables. The desired effects and the estimated effects of unknown dynamics are combined and multiplied by a pseudo inverse of a control matrix to obtain a control value. An error vector is multiplied by a feedback gain matrix and added to the control value to produce signal inputs to the process.

9 Claims, 3 Drawing Sheets

TIME DELAY CONTROLLED PROCESSES

BACKGROUND OF THE INVENTION

This invention is directed to time delay controlled processes, such as those that may be useful with a servo-system, a robot arm or a magnetically suspended rotor.

A general control strategy consists of at least two levels: a high level controller and a low level controller. The high level controller may perform several functions: (1) observe the state of the system, (2) accept inputs from environment, (3) perform filtering and estimation, (4) decide whether a task is realizable, etc. It then generates a command which is sent to a low level controller. The low level controller, on the other hand, has a few other functions: (1) observe the state of the system, (2) filter and estimate and (3) compute the control action. The control action is generated in order to execute a realizable command issued by the high level controller independent of system dynamic varations. These variations may be due to internal system changes or external disturbances. Internal factors may include parameter changes and/or function changes. A function change could be manifested by the change of the "constituted relation of an element". For example, a spring characteristic could vary from a linear one, where only one constant is used in the model to a hardening spring where two constants may be used. The present invention is directed to the design of low level controllers that guarantee the proper execution of realizable tasks.

The low level control of systems with unknown dynamics and unpredictable disturbances has raised some challenging problems. This is particularly important when high system performance is to be guaranteed at all times. Some classical control methods deal with well known, linear, time-invarient systems. In many applications, however, some relevant part of the system may be unknown, time varying, or nonlinear. Controlled systems are thus often limited to operating in only a small portion of their available range. For example, servo motors must operate in the linear part of their range for accurate control. Robot arms and magnetically controlled rotors, such as those used in a turbo molecular pump, are examples of physical processes which would benefit greatly from improved control systems.

Several types of control strategies have been developed to deal with nonlinear, time-variant systems. One of the first methods to accommodate nonlinear systems was Model Reference Control. This technique employs a model of the system and uses the difference between the model response and the plant response as the input signal to the plant [7]. The model is either a physical model or a simulated system on a computer. Although it has no variable parameters, it is very useful for either specifying desired performance or for the observation of unaccessable states. A drawback in this technique is that it requires knowledge of the full dynamic model and system limitations. When perfect cancellation of the system nonlinearities is not achieved due to imperfect modeling or inaccurate parameter values, the dynamic performance of the plant may be degraded to the point of closed loop instability [8].

Another advanced technique is Adaptive Control. An adaptive system measures a certain index of performance which is a function of the inputs, states or outputs of the system. From the comparison of the measured index of performance with a set of given ones, the adaptation mechanism modifies the parameters of the controller [6]. There are several classes of adaptive control. A very common variation used a model for the system as a basis for comparison and is termed Model Reference Adaptive Control (MRAC). It adjusts the controller parameters while keeping the model parameters constant. In contrast is the 'self-tuning' system introduced in reference [1] in which the controller parameters are held fixed while the model parameters are modified. Another approach generates the control action in part by an adaptive feedforward controller which 'behaves' as the 'inverse' of the plant [8]. All adaptive controllers share the distinguishing feature of system identification followed by variation of parameters to maintain desired performance. A drawback of adaptation is that it is generally slow and computationally intense. Often the environment changes faster than the system, causing performance degradation or even instability.

Other control methods, such as Variable Structure Controllers, take totally different strategies to achieve stability in nonlinear, time-invariant systems. This type of controller utilizes state feedback in a control law which switches the structure of the closed loop system between trajectories which may themselves be unstable or marginally stable but when combined by the control law in a switching technique, result in a system which is stable. A method of switching called 'sliding mode', described in [9,10,11], arranges the switching so that ideally the system remains on one of the switching lines (or surface) as it 'slides' stably toward the origin of the phase plane. Real systems, however, take time to switch trajectories, resulting in periods of infinite frequency, or no control, as the system switches from one trajectory to another while attempting to remain on the switching line. This high frequency chattering undesirably excites high frequency dynamics.

During the 1970's, several control algorithms emerged which attempt to force a systems response to track a desired trajectory. Two such algorithms which have received significant attention are Model Algorithmic Control (MAC) and Dynamic Matrix Control (DMC) [2,12]. These two algorithms utilize a discrete model representation of a controlled system to minimize predicted future errors relative to a given reference trajectory over a given preview horizon [5]. These two approaches might be grouped under the two more general topics of preview or predictive control. Predictive and preview control are similar in that they attempt to minimize a predicted error, or cost function, over a given preview horizon. Preview control, however, does require a state-space description of the plant. A predictive controller may be used if a simulation and the system step responses are available. Predictive and preview control algorithms are generally computationally intensive since they involve the minimization of some cost function over a preview horizon. Accordingly, they are suitable for control of systems with relatively large time constants. Many improvements to the general method of predictive control have been made over the years to generalize controller design to multivariable systems and to make possible several types of stability robustness analyses. Increases in computational speeds of commonly available microprocessors continue to allow the application of such a control algorithm to systems with increasingly fast dynamics. However, it should be emphasized that the algorithm is based upon the assumption that the dynamics of the controlled system are known, either in terms of analytical models or step response data.

Another method, Time Delay Control (TDC) was originally formulated by Youcef-Toumi and Ito [12] for a class of nonlinear systems with linear input action. Time delay control introduced in references [13,14,15,16], depends neither on estimation of specific parameters, repetitive actions, infinite switching frequencies, nor discontinuous control. It employs, rather, direct estimation of the effect of the plant dynamics through the use of time delay. The controller uses the gathered information for position, velocity and acceleration to cancel the unknown dynamics and disturbances simultaneously and then inserts the desired dynamics into the plant. The TDC employs past observation of the system response and control inputs to directly modify the control actions rather than adjusting the controller gains. It updates its observation of the system every sampling period, therefore, estimation of the plant is dependent upon the sampling frequency.

There are other systems referred to as time-lag or retarded systems, where time delay exists between the cause and effect. In time delay systems, these delays arise as a result of delays existing in the hardware components or computation [1]. In the present invention, the time forumulation for such time delay systems leads to delayed differential equations. A special class of these equations are referred to as integral-differential equations which were studied by Volterra [10]. Volterra was the first to study such systems and developed the theory to investigate the consequences of time delay. Several other researchers have contributed to the development of the general theory of the Volterra type.

It is an object of the present invention to adapt time delay control for use with magnetically suspended rotors and for robot arms. It is a further object of the present invention to provide an improved formulation of time delay control by using convolutions.

SUMMARY OF THE INVENTION

The present invention is directed to a time delay control method for controlling a process having a plurality of input variables and a plurality of state variables dependent on the input variables. The method estimates the effects of unknown dynamics by using calculations representative of convolutions involving past data.

The state variables of a process are periodically measured and stored. A vector of desired state variables and a vector of commands are provided to the system by a user of a high level controller. Desired dynamics are generated from these vectors to produce a corresponding constant matrix for each vector. Measured variables are compared to the desired variables to produce an error vector. Unknown dynamics are estimated by using calculations representative of convolutions involving past data and a state transition matrix. Desired effects are calculated by substituting the present values of the state variables and of the command vector into the desired dynamics. The estimated effects of unknown dynamics and the present desired effects and the effects of known dynamics, if any, are combined. The combination is multiplied by a pseudo inverse of a control matrix. The result is combined with the product of an error vector and a feedback gain matrix to produce control signals that are used to provide adjusted input variables into the process.

The method of the present invention can be used with a magnetically suspended rotor. In such an application, the state variables correspond to the position of the rotor relative to the magnetic bearings used to suspend the rotor. The control method is used to adjust the currents into each of the magnetic bearings. The present invention may also be used to control a robot arm in which the state variables correspond to the location and orientation of the robot arm links. The control method is used to adjust the power used to drive each of the motors which operate the arm.

The present invention advantageously only needs to make use of the state variables. The second derivative such as acceleration is not required. It is a further advantage of the present invention that the control method is dynamically adaptable so as to overcome disturbances to the process which functionally alter the relationships between the input variables and the state variables.

Other objects and advantages of the invention will become apparent during the following description of the presently preferred embodiments of the invention taken in conjunction with the drawings.

DETAILED DESCRIPTION OF THE PREFERRED EMBODIMENTS

Figure 1:
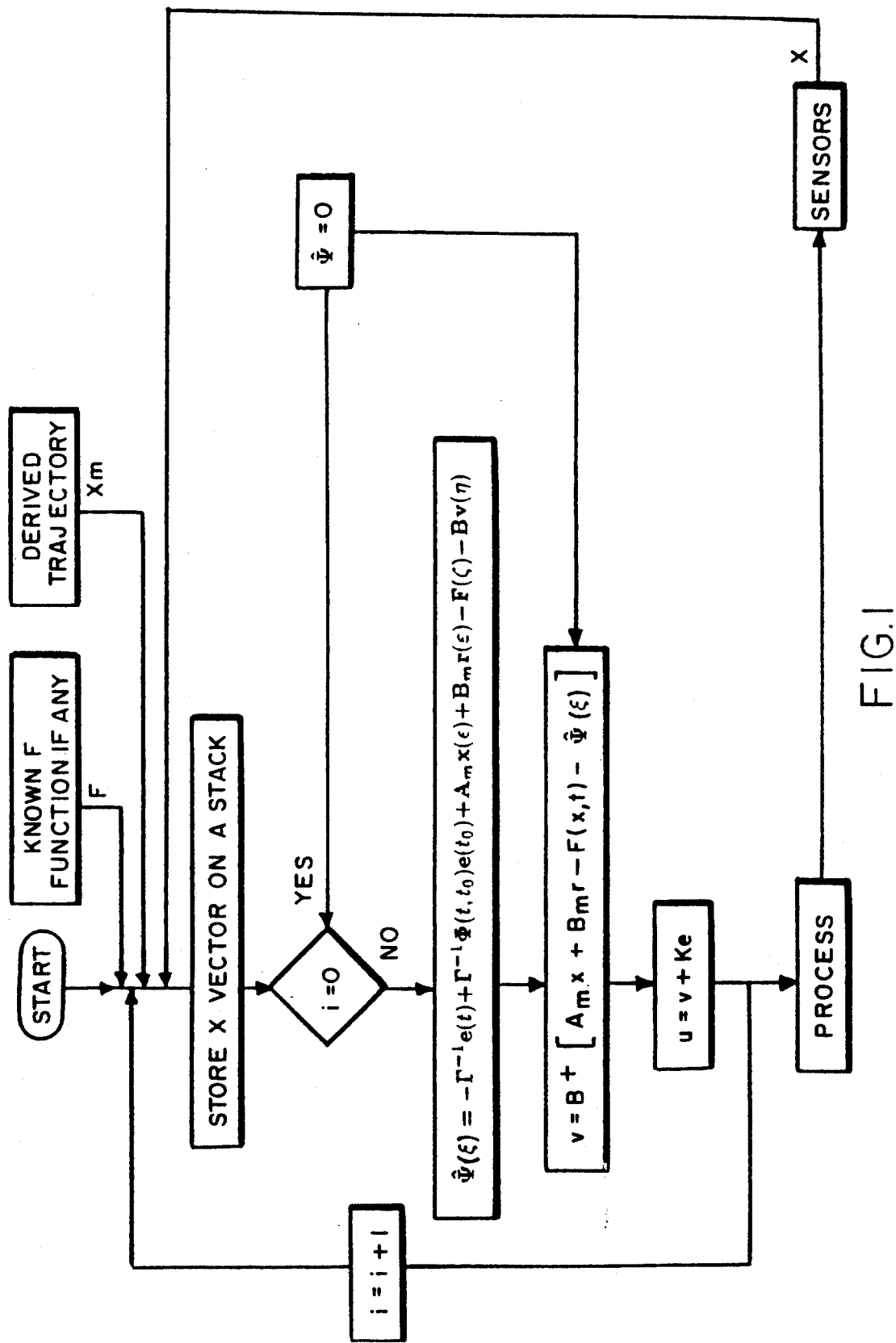
FIG. 1 is a flow chart of the control method of the present invention.

The systems of interest to be controlled with the present invention are described by the following dynamic equations:

$$\dot{x} = f(x,u,t) = F(x,t) + G(x, u, t) + D(t) \quad (1)$$

where $x \in R^n$ is a plant state vector, i.e., a vector of state variables, and $u \in R^r$ is a control vector, i.e., a vector of control inputs. $F(x,t)$ and $G(x,u,t) \in R^n$ are nonlinear vectors representing respectively the known and unknown part of the plant dynamics, and $D(t) \in R^n$ is an unknown disturbance vector. The variable t represents time. The expression of Eqn.(1) is common in many applications. For example, in magnetic suspensions, the function $G(x, u, t)$ involves both the control currents and the air gaps. This is the case since the magnetic force is proportional to the current squared and inversely proportional to the square of the air gap. The vector $D(t)$ represents other kinds of effects that are state independent. The objective of this invention is to be able to control such systems and guarantee performance despite the presence of large dynamic changes in $G(x, u, t)$ and large unexpected disturbances in $D(t)$.

Eqn. (1) can be rewritten as:

$$\dot{x} = F(x,t) + H(x, u, t) + Bu + D(t) \quad (2)$$

$B \in R^{n \times r}$ is a known constant control matrix of rank r to be selected by the control system designer and the term $H(x, u, t)$ is defined as $$H(x,u,t) = G(x,u,t) - Bu(t)$$

A linear time-invariant reference model describes the desired dynamics of the process being controlled. A user or high level controller provides $x_m \in R^n$ which is a vector of desired state variables, also called a reference model state vector, and $r \in R^r$ which is a vector of commands or command vector. Both of these vectors may be functions of time. The vector of desired state variables is a set of desired trajectories that a process is to follow. In a robot manipulator, this could be the desired trajectory of the robot hand. For a magnetically suspended rotor, the desired state variables may indicate the time function of how the rotor is to move from a touch down position to a levitated position. The command vector may represent break points along such a trajectory or may simply represent the end point of the trajectory.

The linear time-invariant reference model generates a desired dynamics as follows:

$$\dot{x}_m = A_m x_m + B_m r \tag{3}$$

where $A_m \in R^{n \times n}$ is a constant stable system matrix, and $B_m \in R^{n \times r}$ is a constant command distribution matrix. The error vector, e, is defined as the difference between the plant state vector and the reference model state vector, $$e = x_m - x \tag{4}$$

The time rate of change of the error, $\dot{e}$ is then, $$\dot{e} = \dot{x}_m - \dot{x} \tag{5}$$

Using equations (1) and (3) the above equation becomes, $$\dot{e} = A_m x_m + B_m r - [F(x,t) + H(x,u,t) + Bu + D(t)] \tag{5a}$$

We can add and subtract the state vector term $A_m x$ to the above equation in order to bring about an error term. This step leads to $$\dot{e} = A_m x_m + B_m r - [F(x,t) + H(x,u,t) + Bu + D(t)] + A_m x - A_m x \tag{6}$$

which can also be written as $$\dot{e} \times A_m e + [A_m x + B_m r - F(x,t) - \Psi(x,u,t) - Bu] \tag{7}$$

The vector $\Psi$ represents the effects of both unknown dynamics H and D, $$\Psi(x,u,t) = H(x,u,t) + D(t) \tag{8}$$

A control action u is the vector of signals used to determine the inputs to the process being controlled. For example, in a magnetic suspension u represents the currents into the respective magnetic bearings. A control action u can be chosen such that the term between brackets in equation (7) is zero at any instant of time. However, this makes the error dynamics decay at a rate dictated by the reference system matrix $A_m$. Since this is not practical in general it is desired to have the error vanish much faster than the plant or the reference model dynamics. Under these conditions the plant state x will track the reference model trajectory $x_m$. A control action u is desired that forces the error e to zero despite the presence of unknown system dynamics and unpredictable disturbances. In order to adjust the error dynamics, a new vector of control variables v is defined such that $$v = u - Ke \tag{9}$$

where K is a feedback gain matrix. The error dynamics now takes the form $$\dot{e} = [A_m + BK]e + p \tag{10}$$

where the vector p is given by $$p = A_m x + B_m r - F(x,t) - \Psi(x,u,t) - Bv \tag{11}$$

The control law is chosen as $$v = B^+ [A_m x + B_m r - F(x,t) - \overline{\Psi}(x,u,t)] \tag{12}$$

where $B^+$ is the pseudo inverse of B. The actual control input vector u is computed from control variable vector v using Eqn.(9). The term $\overline{\Psi}(x, u, t)$ is the best estimate of the unknown vector function $\Psi(x,u,t)$. The control law as given by Eqn.(12) and Eqn.(9) consists of a few terms. The first two terms in Eqn.(12) dictate the desired dynamics, the third term compensates for the known dynamics and the fourth term compensates for the unknown dynamics. The first three terms are evaluated using the present values of the state variables and the fourth term is evaluated using past information. The expression leading to u involves the error dependent term Ke.

Referring now to FIG. 1, a flow chart of the process for producing the control input vector u is given. The process includes the following steps:

1. Compute the unknown dynamic vector $\overline{\Psi}$. During the first sampling period, this estimate is set arbitrarily to zero since no past information is available at this time. Computation of $\overline{\Psi}$ is described below.
2. Calculate the control variable vector v such that p=0 using the best estimate of the unknown vector $\Psi$.
3. Compute the control input vector u = v + Ke.
4. Output u to the process being controlled and then repeat step 1 in the next sampling period.

A key to this control problem is to obtain a good estimate of $\overline{\Psi}$ without using an explicit description of $\Psi$. In references [14,16], past information has been used including the system state, the input and an estimate of the rate of change of the state to obtain an estimate of the unknown dynamics. In accordance with the present invention, however, we will obtain this estimate using convolutions.

The dynamic behavior of the error is governed by Eqn.(13) and its time response $$e(t) = e^{(A_m + BK)(t - t_0)} e(t_0) + \int_{t_0}^{t} e^{(A_m + BK)(t - \tau)} p(\tau) d\tau \quad t \geq t_0 \tag{13}$$

involves a state transition matrix $\Phi(t, t_0)$, $$\Phi(t, t_0) = e^{(A_m + BK)(t - t_0)} \quad t \geq t_0 \tag{14}$$

Equation (13) is usually used to obtain the time response e(t) in the interval $[t_0, t]$. This is possible once the matrices $A_m$, B and K are specified along with the initial condition $e(t_0)$ and the time history of the forcing term p over the interval $[t_0, t]$. A time interval $[t_0, t]$ represents one sampling period. In each sampling period, the state variables are measured and reported to the control system. The method of the present invention for obtaining an estimate $\bar{\Psi}$ is derived from Eqns.(11,13). Rearranging Eqns.(11,13) leads to, $$\int_{t_0}^{t} \Phi(t,\tau)\Psi(\tau)d\tau = \qquad (15)$$

$$-e(t) + \Phi(t,t_0)e(t_0) + \int_{t_0}^{t} \Phi(t,\tau)A_m x(\tau)d\tau +$$

$$\int_{t_0}^{t} \Phi(t,\tau)B_m r(\tau)d\tau - \int_{t_0}^{t} \Phi(t,\tau)F(\tau)d\tau - \int_{t_0}^{t} \Phi(t,\tau)Bv(\tau)d\tau$$

The integrand of the left hand side of Eqn.(15) is the product of $\Phi$ (t,r) and the unknown vector $\Psi$. Eqn.(15) involves past information and one unknown vector $\Psi$ assuming that the control variable v has been calculated for the time period of interest. Eqn.(15) and the convolutions found therein are a major feature of the present invention. The state transition matrix $\Phi$ is convolved with the desired dynamics functions $A_m x$ and $B_m r$, the known dynamics function F and the control signal function Bv. Assuming that the functions $\Psi$ x, r, F, and v do not vary significantly over the time interval $[t_o,t]$, the convolutions can be simplified to obtain $$\bar{\Psi}(\epsilon) \approx -\Gamma^{-1} e(t) + \Gamma^{-1}\Phi(t,t_0)e(t_0) + \qquad (16)$$

$$-\Gamma^{-1}\left[\int_{t_0}^{t} \Phi(t,\tau)d\tau\right]A_m x(\epsilon) + \Gamma^{-1}\left[\int_{t_0}^{t} \Phi(t,\tau)d\tau\right]B_m r(\epsilon) -$$

$$\Gamma^{-1}\left[\int_{t_0}^{t} \Phi(t,\tau)d\tau\right]F(\zeta) - \Gamma^{-1}\left[\int_{t_0}^{t} \Phi(t,\tau)d\tau\right]Bv(\eta)$$

where the convolution dummy matrix $\Gamma$ $(t,t_o)$ is given by $$\Gamma(t,t_0) = \int_{t_0}^{t} \Phi(t,\tau)d\tau \quad t \geq t_0 \qquad (17)$$

The vectors $\bar{\Psi}$ ($\xi$), x($\epsilon$), r($\epsilon$), F($\zeta$) and v($\eta$) are based on past information representing estimates at times $\xi$, $\epsilon$, $\epsilon$, $\zeta$ and $\eta$ within $[t_o,t]$. Equation (16) can be simplified leading to $$\bar{\Psi}(\xi) = -\Gamma^{-1}e(t) + \Gamma^{-1}\Phi(t,t_0)e(t_0 \\ )+A_m x(\epsilon)+B_m r(\epsilon)-F(\zeta)-Bv(\eta) \qquad (18)$$

The last four terms in Eqn.(18) are representative of the convolutions involving the state transition matrix and past information, in particular, the desired dynamics, the known dynamics and the control matrix function.

The method used to compute the convolutions in Eqn.(15) and evaluate the different functions at specific times within the interval $[t_o,t]$ is central to obtaining an estimate of the vector $\Psi$. The accuracy in obtaining this estimate also depends on the interpolation scheme used when more than one sampling period is considered. Of course, the selection of the time interval $[t_o,t]$ is important. If we use data from one sampling period in the past, the vector $\Psi$ can be estimated by $$\bar{\Psi} = -\Gamma^{-1}e(t)+\Gamma^{-1}e^{(A_m+BK)(t-t_0)}e(t_0)+A_m x_{avg}+ \\ B_m r_{avg}-F_{avg}-Bv(t_0) \qquad (19)$$

where $x_{avg}$, $r_{avg}$, $F_{avg}$ are respectively the average values of x,r,F in the interval $[t_o,t]$. The estimate $\bar{\Psi}$ approximates the system dynamics one sampling time in the past using present and past data. In this case, the present data involves the error e(t). The past data consist of the initial condition $e(t_o)$ at time $t_o$, the control input $v(t_o)$ and the average values discussed earlier. Rather than use average values, acceptable performance may also be obtainable using the past values evaluated at $t_o$. A better estimate may be obtained by using more than one sampling period in the interval $[t_o,t]$. In order to obtain an estimate of $\Psi$ using q sampling periods in the time interval $[t_o,t]$ one could rewrite the left and right hand sides of Eqn.(15) as follows $$\int_{t_0}^{t} \Phi(t,\tau)\Psi(\tau)d\tau = \int_{t_0}^{t_1} \Phi(t,\tau)\Psi(\tau)d\tau + \qquad (20)$$

$$\int_{t_1}^{t_2} \Phi(t,\tau)\Psi(\tau)d\tau + \ldots + \int_{t_q}^{t} \phi(t,\tau)\Psi(\tau)d\tau$$

This could be approximated by $$\int_{t_0}^{t} \phi(t,\tau)\Psi(\tau)d\tau \approx \left[\int_{t_0}^{t_1} \Phi(t,\tau)d\tau\right]\Psi_{01} + \qquad (20a)$$

$$\left[\int_{t_1}^{t_2} \Phi(t,\tau)d\tau\right]\Phi_{12} + \ldots + \left[\int_{t_{q-1}}^{t} \Phi(t,\tau)d\tau\right]\Psi_{q-1,q} \approx$$

$$\Gamma(\Psi_{01} + \Psi_{12} \ldots + \Psi_{q-1,q})$$

Note that the vector function $\Psi_{i-1,i}$ is evaluated within the intervals $[t_{i-1},t_i]$. We may now write Eqn.(20) in the interval $[t_o,t]$ as $$[\Psi_{01} + \Psi_{12} + \ldots + \Psi_{q-1,q}] \approx -\Gamma^{-1} e(t) + \Gamma^{-1}\Phi(t,t_0)e(t_0) \qquad (21)$$

$$+ A_m[x_{01} + x_{12} + \ldots + x_{q-1,q}] + B_m[r_{01} + r_{12} + \ldots + r_{q-1,q}] -$$

$$[F_{01} + F_{12} + \ldots + F_{q-1,q}] - B[v_{01} + v_{12} + \ldots + v_{q-1,q}]$$

where $x_{i-1,i}, r_{i-1,i}, F_{i-1,i}$ and $v_{i-1,i}$ for $i=1,2 \ldots q$ are estimates of the variables $x(\epsilon), r(\epsilon), F(\zeta)$ and $v(\eta)$ in the interval $[t_{i-1},t_i]$. With some algebraic manipulations of the above equations, the estimate $\bar{\Psi}$ is found to be $$\Psi_{q-1,q} \approx \Gamma^{-1}e(t) + \Gamma^{-1}\Phi(t,t_0)e(t_0) + A_m x_{q-1,q} + B_m r_{q-1,q} \qquad (22)$$

$$F_{q-1,q} - Bv_{q-1,q} + \Gamma^{-1}[e(t_1) + e(t_2) + \ldots + e(t_q - 1)] -$$

$$\Gamma^{-1}\Phi(L,0)[e(t_0) + e(t_1) + \ldots + e(t_{q-2})]$$

where L is the sampling period, i.e., $t_1-t_0$.

The control method of the present invention is summarized in FIG. 1. Measurement sensors provide the process state variables vector x to the control processor. The state variables are stored using a stack or other commonly used storage method so as to save at least the recent past data. An estimate of the unknown dynamics is determined using functions representative of convolutions involving the state transition matrix and several functions evaluated using the recent past data. The control variable vector v is evaluated using the present data for the desired dynamics and the known dynamics and using the unknown dynamics effects estimated from past data. The control variable vector is added to the product of the feedback gain matrix K and the error vector e to generate the control inputs u(t). The control inputs are then fed into the process so as to effect the desired control.

Figure 2:
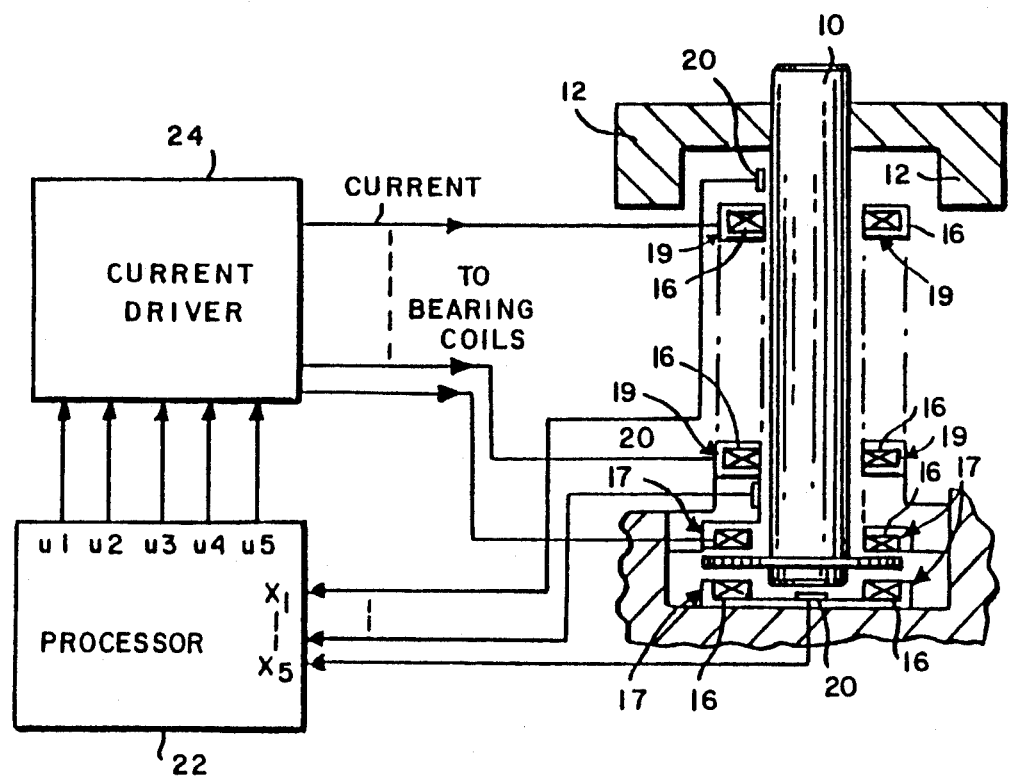
FIG. 2 is a side view of a turbo molecular pump with a magnetically suspended rotor which is controlled by the method of the present invention.
Figure 3:
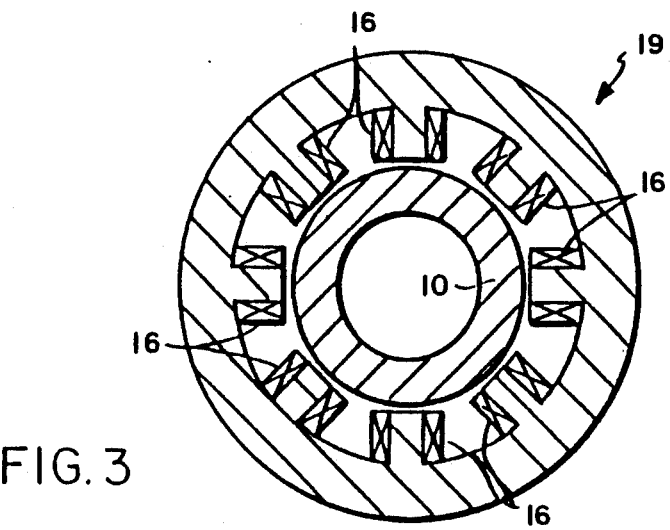
FIG. 3 is a sectional view of the pump of FIG. 2.

A turbo molecular pump is a device used to create vacuum in special environments such as in integrated circuit manufacturing environments. A schematic diagram of this pump is shown in FIGS. 2 and 3. The pump action is produced once the rotor 10, with blades 12 attached to it, is spun by an induction motor. In order to minimize impurities and particle generation, the rotor is suspended magnetically in the x, y and z directions by magnetic bearings. A magnetic bearing is provided with electric coils 16 which produce magnetic fields to suspend the rotor. In the presently preferred pump, the rotor 10 is suspended by one thrust bearing 17 and two radial bearings 19. These bearings receive five control inputs. The thrust bearing 17 receives one input related to control in the z direction. Each of the radial bearings 19 has two control inputs one related to control in the x direction and one related to control in the y direction. The control inputs u(t) determined by processor 22 are used by a current driver 24 to proportionally provide currents into the various coils 16 distributed around each bearing to achieve the desired force in one of the controlled directions. The current driver includes an amplifier for providing a desired level of current.

In accordance with the presently preferred turbo molecular pump, the rotor mass is 2.2 Kg. The desired air gap between the rotor 10 and the thrust bearing 17 is preferably 400 microns. The desired air gap between the rotor 10 and the radial bearings 19 is 250 microns. The bearings handle a maximum of 10 amperes. The maximum rotational speed of the rotor of the presently preferred embodiment is 45,000 rpm.

This system has five degrees of freedom each of which may be described by a differential equation of the form, $$\frac{d}{dt}\begin{bmatrix} x_q \\ \ldots \\ x_v \end{bmatrix} = \begin{bmatrix} x_r \\ \ldots \\ F_p(x,t) \end{bmatrix} + \begin{bmatrix} 0 \\ \ldots \\ G_r(x,u,t) \end{bmatrix} + \begin{bmatrix} 0 \\ \ldots \\ D_r(t) \end{bmatrix} \quad (23)$$

where $x_q \in R^5$ and $x_r \in R^5$ represent displacements and velocities respectively. The current input to the electromagnets are represented by the vector $u \in R^5$. Note that since the magnetic force is proportional to the current squared and the gap distance squared the function $G_r(x,u)$ is a nonlinear function dependent on the state x and the control action u.

The displacements $X_q$ are measured by inductive sensors 20 and provided to the processor 22. Three sensors 20 are shown in FIG. 2, however, two more sensors positioned into or out of the plane of the drawing are also included for sensing the displacement orthogonal to the other two radial sensors. While inductive sensors 20 are used in the presently preferred embodiment, any other suitable measuring device such as an optical or capacitive sensor may be used to measure the displacements.

This plant is a multi-input, multi-output and unstable open loop. Disturbances and coupling include forces due to gravity, magnetic actions, unbalance and gyroscopic effects. All of these effects will show up in the vector function G. This particular device experiences drastic dynamic changes in G. Therefore, dynamic information describing this behavior would be necessary if a conventional control system is used otherwise the system performance may be acceptable only for some specific operating conditions. By using the control system of the present invention, excellent performance is obtainable over a wide range of disturbances and dynamic effects.

Figure 4:
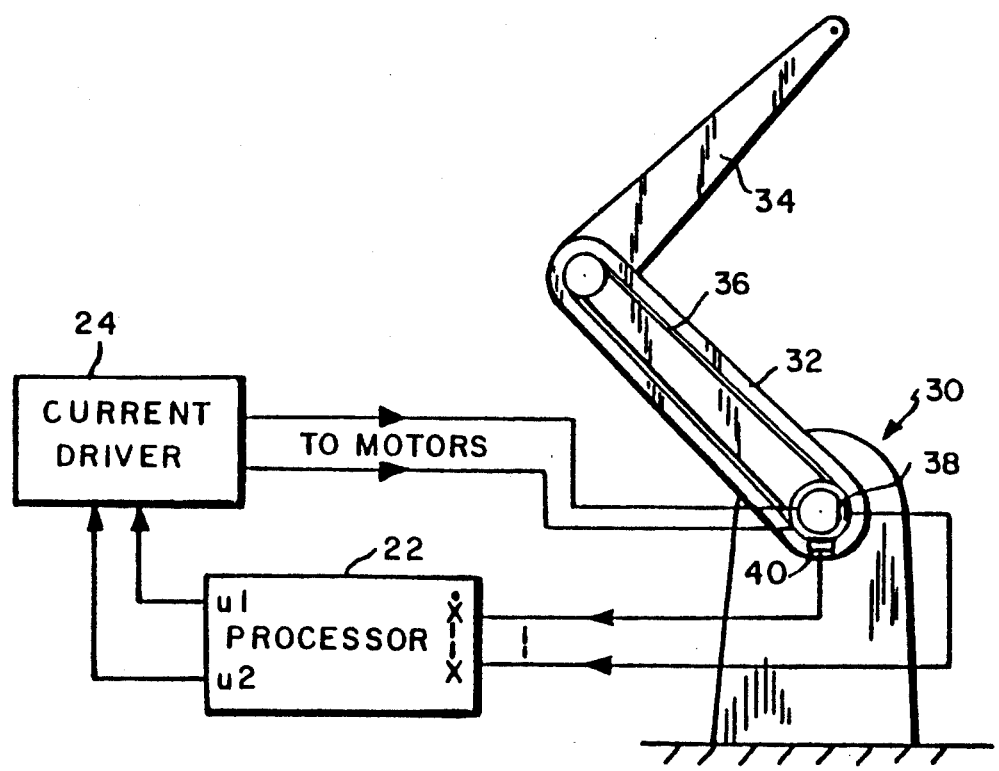
FIG. 4 is an illustration of a robot manipulator controlled by the method of the present invention.

Another application for implementing the control system of the present invention can be a robot manipulator such as that illustrated in FIG. 4. FIG. 4 illustrates a simple arm with two degrees of freedom. This manipulator has two motors or actuators (not shown) mounted at the base. The first motor drives a first link 32 of the arm and the second motor drives a second link 34 through a steel belt 36. Each axis is equipped with a position sensor 38 (one shown) and a tachometer 40 (one shown). The position sensor 38 may be a potentiometer, encoder or some other known device. The tachometer 40 is used to measure velocity and may also be replaced by another suitable velocity sensor. The control system processor 22 produces control inputs u(t) in response to the positions and velocities. The control inputs regulate the amount of current provided by current driver 24 to each of the motors.

The robot arm system's equations are extremely complex involving Coriolis and centrifugal effects among others. Thus, it is very difficult to determine functions which can predict the behavior of the arm, especially when the relationships would be altered by a disturbance such as when the arm picks up a load of unknown weight. Using the control method of the present invention based on estimating unknown effects using convolutions of past information and a state transition matrix, it is possible to maintain highly acceptable controlled performance without attempting to set forth function and its parameters.

By using the control system of the present invention, control is maintained despite nonlinear and unknown dynamics. Rather than estimating parameters for equations meant to simulate the effects on the controlled process, the present invention advantageously uses recent past information to estimate the unknown functions themselves.

Of course, it should be understood that various changes and modifications to the preferred embodiments described above will be apparent to those skilled in the art. Such changes can be made without departing from the spirit and scope of the invention and without diminishing its attendant advantages. It is therefore intended that such changes and modifications be covered by the following claims.

I claim:

1. A method for controlling the operation of a process having a plurality of input variables and a plurality of state variables dependent on said input variables, said method comprising:

periodically measuring said state variables to obtain a present value of said state variables and to store past values of said state variables;

generating desired dynamics for said state variables from a vector of desired state variables and a vector of commands so as to produce a corresponding constant matrix for each vector;

determining an error vector corresponding to differences between the present values of said state variables and the vector of desired state variables;

estimating effects of unknown dynamics on said process by using calculations representative of convolutions involving past values of said state variables;

calculating present desired effects by substituting into said desired dynamics, the present value of said state variables and a present value of the vector of commands;

combining said estimated effects of unknown dynamics with said present desired effects;

multiplying said combination of effects by a pseudo inverse of a control matrix to obtain a control value; and combining said control value with the product of said error vector and a feedback gain matrix to produce signals for use in adjusting said input variables.

2. The method of claim 1 wherein said step of combining said estimated effects of unknown dynamics with said present desired effects further combines said effects with effects of known dynamics on said process as evaluated using the present value of said state variables.

3. The method of claim 1 wherein said step of estimating effects of unknown dynamics further involves a state transition matrix.

4. The method of claim 1 wherein said process comprises magnetically suspending a rotor with a plurality of bearings and wherein said state variables correspond to position of said rotor relative to said bearings.

5. A time delay control method comprising:
(a) operating a process having a plurality of state variables and a plurality of control inputs, said plurality of control inputs being determined as a function of a vector of control variables;
(b) successively sampling the values of said state variables so as to supply present values of said state variables and to store past values of said state variables;
(c) supplying a vector of desired state variable values and a vector of command values as a function of time;
(d) taking a difference between corresponding present values of said state variables and said desired state variable values to obtain an error vector and storing past values of said error vector;
(e) generating desired dynamics based on past values of said state variables and command values;
(f) multiplying a control matrix by a past value of said vector of control variables;
(g) multiplying a past value of said error vector by a convolution dummy matrix and by a state transition matrix which is a function of said control matrix, the time delay between successive samplings, a constant matrix determined by said desired dynamics and a feedback gain matrix;
(h) multiplying the convolution dummy matrix by said error vector;
(i) generating desired dynamics based upon present values of said state variables and command values;
(j) combining each of the results from steps (e) through (i) to provide a raw vector;
(k) multiplying said raw vector by a pseudo inverse of said control matrix to produce said vector of control variables;
(l) multiplying said error vector by the feedback gain matrix and adding said product to said vector of control variables to produce said plurality of control inputs; and
(m) inputting said control inputs to said process.

6. The method of claim 5 further comprising the steps of:
(n) solving for known dynamics of said process based on past values of said state variables; and
(o) solving for known dynamics of said process based upon present values of said state variables; and
wherein said step of combining results further combines the results of steps (n) and (o) to obtain said raw vector.

7. A controlled system of magnetic bearings comprising:
a plurality of magnetic bearings each having at least one current input;
a rotor suspended magnetically by said plurality of magnetic bearings;
means for sensing the position of said rotor relative to said magnetic bearings;
control means, periodically receiving the position data from said sensing means, for determining new values for the current inputs to said magnetic bearings as a function of at least: the difference in the sensed position of the rotor from a desired position; a feedback gain matrix; a reference model; and functions representative of convolutions of a state transition matrix with a state vector associated with the position relative to all the magnetic bearings, a command vector and a control signal vector using data from a past sensing of position.

8. The controlled system of claim 7 wherein the new values of the current inputs as determined by said control means are also a function of known dynamics of the controlled system and a function representative of the convolution of said state transition matrix and a known dynamics vector.

9. A method for generating a plurality of input signals to a robot arm having a plurality of links to move said arm in accordance with a trajectory set forth by desired state variable values and a command vector, said method comprising:
receiving values for a plurality of state variables to form a state vector representative of the position and velocity of the links of said robot arm;
determining an error vector corresponding to the difference between the received state variable values and the desired state variable values;
multiplying said error vector and a feedback gain matrix to obtain an error dependent factor;
providing a state transition matrix corresponding to a function of time and a constant formed by a reference system matrix, a control matrix and said feedback gain matrix;
estimating the effects of unknown system dynamics on said robot arm by using calculations representative of convolving said state transition matrix with the state vector, the command vector and a past control variable vector evaluated using past received state variable values;
calculating a present control variable vector by multiplying a pseudo inverse of said control matrix by a combination of at least said estimated effects and a known dynamics vector using present received state variable values;
combining said present control variable vector with said error dependent factor to determine a plurality of input signals for said robot arm.

* * * * *